(12) United States Patent
Szocs (10) Patent No.: US 9,274,755 B2
(45) Date of Patent: Mar. 1, 2016

(54) INFRASTRUCTURE FOR GENERATING CODE USING ANNOTATION AND TEMPLATE GENERATORS

(75) Inventor: Vojtech Szocs, Bratislava (SK)

(73) Assignee: Red Hat Israel, Ltd., Raanana (IL)

( * ) Notice: Subject to any disclaimer, the term of this patent is extended or adjusted under 35 U.S.C. 154(b) by 563 days.

(21) Appl. No.: 13/604,132

(22) Filed: Sep. 5, 2012

(65) Prior Publication Data

US 2014/0068552 A1   Mar. 6, 2014

(51) Int. Cl.
*G06F 9/44* (2006.01)
*G06F 9/45* (2006.01)
*G06F 9/445* (2006.01)

(52) U.S. Cl.
CPC .. *G06F 8/30* (2013.01); *G06F 8/40* (2013.01); *G06F 8/41* (2013.01); *G06F 8/423* (2013.01); *G06F 9/44526* (2013.01); *G06F 8/36* (2013.01)

(58) Field of Classification Search
None
See application file for complete search history.

(56) References Cited

U.S. PATENT DOCUMENTS 6,654,953 B1 * 11/2003 Beaumont et al. ............ 717/158

* cited by examiner

*Primary Examiner* — Jason Mitchell
*Assistant Examiner* — Mark Gooray
(74) *Attorney, Agent, or Firm* — Lowenstein Sandler LLP (57) ABSTRACT

A method for generating boilerplate code is provided. The method may include scanning an initial source code file for an annotation identifying metadata of an element, scanning a generator module for instructions for processing the metadata of the element, and scanning the generator module for a template module that includes an indication of a location for inserting the processed metadata of the element in an output file. The method may further include processing the metadata of the element of the generator module according to the instructions, and inserting the processed metadata of the element at the indicated location in the output file.

20 Claims, 9 Drawing Sheets

@Generator ← 602
public interface EntityXmlGenerator {
    @Produces( ← 506
604 ↗
        output = "my-business-entities.xml", // Output file ← 335
        template = "my-template.fml") // Template file ← 310
    @ForAllElements(@Where(
        kind = CLASS, // Matching all classes...
614
        annotations = "Entity", // ...marked with annotation ← 610
        matchResultVariable = "entities" // ...and provide them to ← 612
                               // the template as variable
608
    void methodNameIsNotSignificant();
}

```
<business-entities>
<entity>
Customer
</entity>
<entity>
Order
</entity>
</business-entities>
```

INFRASTRUCTURE FOR GENERATING CODE USING ANNOTATION AND TEMPLATE GENERATORS

TECHNICAL FIELD

Embodiments of the present invention relate to computer programming tools, and more specifically, to a method and system for generating boilerplate code.

BACKGROUND

During a system requirements or software architectural design phases of a computer software project, common elements or modules may be identified and assigned to individual software developers. Anticipating commonalities at a high level and early in development renders a project more modular and easier to maintain. This reduces human error and other related costs and increases the reliability of the resulting code.

However, not all commonalities are easy to discern before coding begins. As each project grows and gains complexity over time, its source code or other files may reveal patterns that repeat throughout the project code base. Source code, whether it is C++, Java, Perl, HTML or XML files, may include portions that repeat in many places with little or no alteration.

These repetitive portions of code can be technology or domain oriented, well-known or emerging, affecting code or other project artifacts. In most cases, maintaining such files by hand makes little sense, since human error may result in lost reliability of the resulting code.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

A method and system for generating boilerplate code are described herein. In one embodiment, an annotation engine on a processing device scans a module for an annotation identifying metadata of an element. The annotation engine scans a generator module for instructions for processing the metadata of the element. A template engine on the processing device scans the generator module for a template module that includes an indication of a location for inserting the processed metadata of the element in an output file. The template engine processes the metadata of the element of the generator module according to the instructions. The template engine inserts the processed metadata of the element at the indicated location in the output file.

In one embodiment, the annotation engine may be a Java annotation tool that supports Java annotation processing (JSR-269) specification (i.e., the Java compiler). The template engine may be the open source FreeMarker template engine.

In one embodiment, the metadata of the element comprises information about the class of the element. In one embodiment, instructions for processing metadata of the element in the generator module may comprise instructions for matching at least one variable corresponding to the element. The at least one variable to match in the generator module may be a Java source code element. The Java source code element may be one of a class, a class method, an interface, a variable, a parameter, or a package. The at least one variable to match in the generator module may be accepted as at least one variable in the template module.

In one embodiment, the instructions for processing the metadata of the element in the generator module may further comprise instructions for processing the template module. In one embodiment, instructions for processing the metadata of the element in the generator module may comprise instructions for matching each of the at least one variable meeting a criterion. In another embodiment, instructions for processing the metadata of the element in the generator module may comprise instructions for a construct for matching all of the at least one variable meeting a criterion.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "receiving," "monitoring," "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Figure 1:
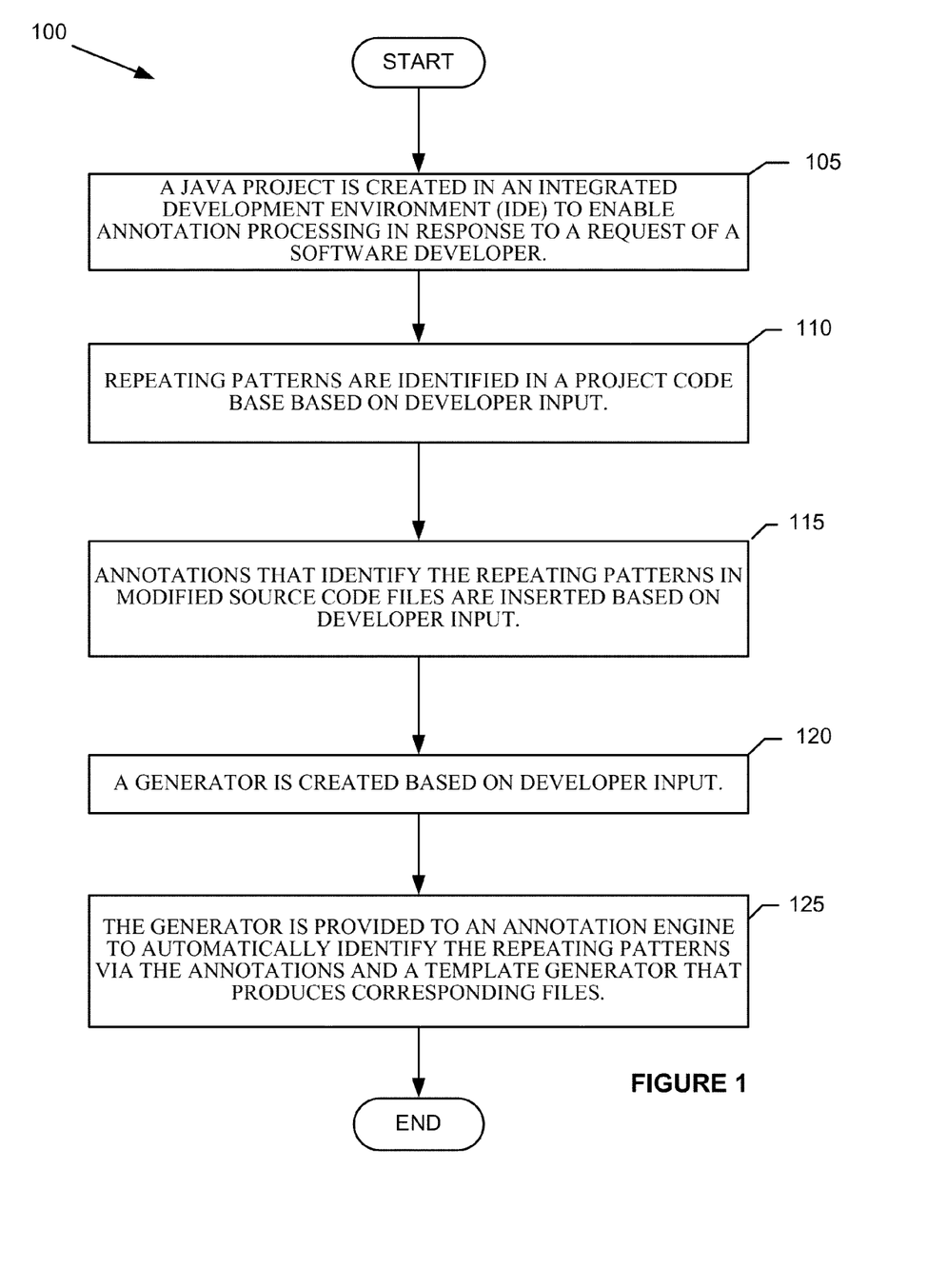
FIG. 1 depicts one embodiment of a process to identify and generate boilerplate code using an annotation engine and a template engine that operates on source code that comprises annotations.

Embodiments of the present invention provide a method and system for generating boilerplate code. FIG. 1 depicts one embodiment of a process 100 to identify and generate boilerplate code using an annotation engine and a template engine that operates on source code that comprises annotations. In one embodiment, the process 100 combines the open source FreeMarker template engine with Java annotation processing capability. Alternatively, any other software tools that support template generation based on a computer language that includes user-defined annotations may be employed.

At block 105, a Java project is created in an integrated development environment (IDE) to enable annotation processing in response to a request of a software developer. At block 110, repeating patterns are identified in a project code base based on developer input. At block 115, annotations that identify the repeating patterns in modified source code files are inserted based on developer input. At block 120, a generator module ("generator") is created based on developer input. At block 125, the generator is provided to an annotation engine (e.g., a Java annotation processing tool) to automatically identify the repeating patterns via the annotations and a template generator (e.g., FreeMarker) that produces corresponding files (e.g., any files—source code, configuration, etc.).

Output files may be generated based on the given template. Each template can expose variables as defined by the generator. For example, all Java classes that carry certain annotations may be matched, and the matched information may be exposed to the template generator as a list variable.

Figure 2:
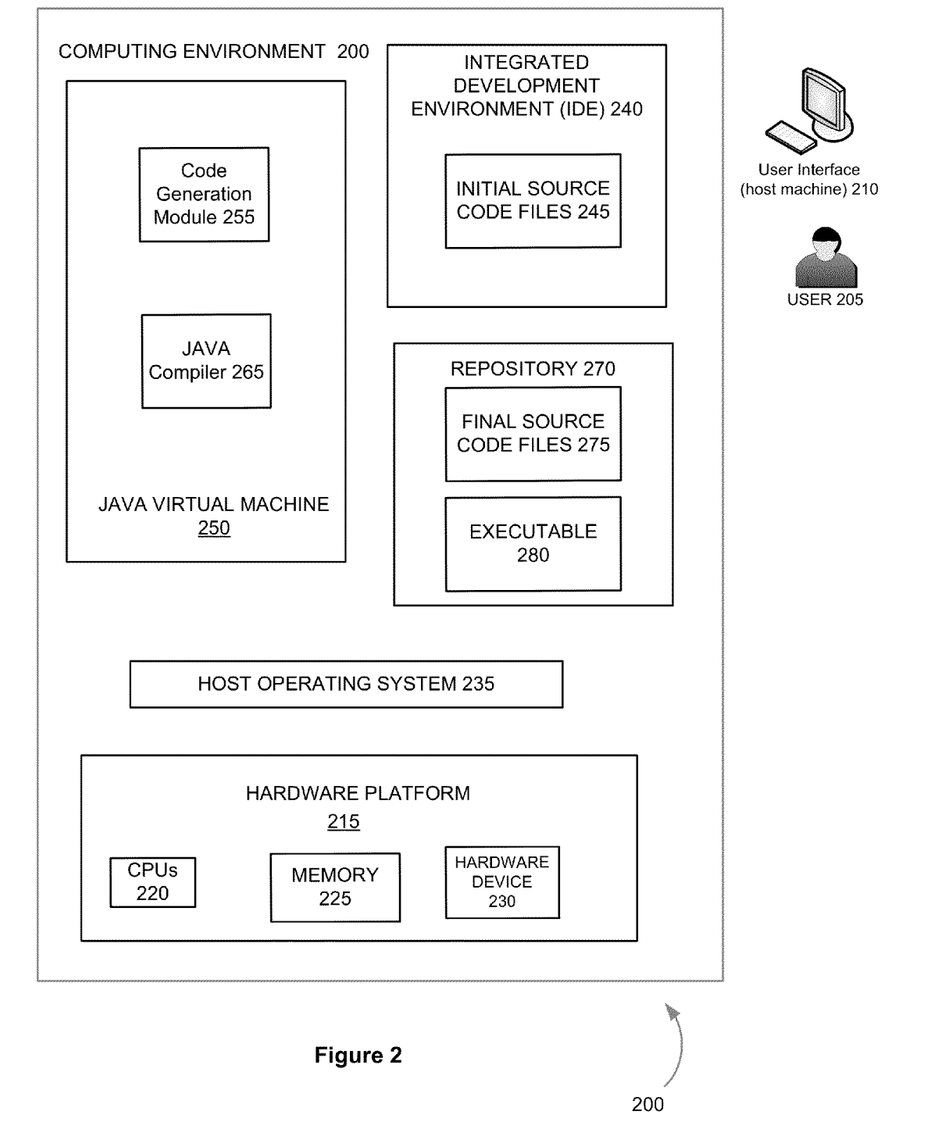
FIG. 2 illustrates one embodiment of a computing environment for generating boilerplate code in which embodiments of the present invention may be implemented.

FIG. 2 illustrates one embodiment of a computing environment 200 for generating boilerplate code in which embodiments of the present invention may be implemented. The computing environment 200 may be implemented on a hardware platform 215 as a server, client, workstation, desktop, tablet, or any other machine. It can also be implemented in one or more small portable platforms such as a notebook, a PDA (personal digital assistant), or wireless web devices, and other devices. The hardware platform 215 may include one or more central processing units (CPUs) 220. The hardware platform 215 may also include additional hardware devices 230, such as network interface cards (NICs), sound or video adaptors, photo/video cameras, printer devices, keyboards, displays or any other suitable device intended to be coupled to a computer system. The hardware platform 215 may also include a memory 225. In one embodiment, the memory 225 comprises one or more hardware and software devices, which may be located internally and externally to the computing environment 200. Examples of memory 225 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

The hardware platform may host an operating system 235, such Microsoft Windows®, Linux®, Solaris®, Mac® OS, etc., that provides services between the underlying hardware platform 215 and a user interface 210, an integrated development environment (IDE) 240, a Java virtual machine 250, and a repository 270.

Figure 3:
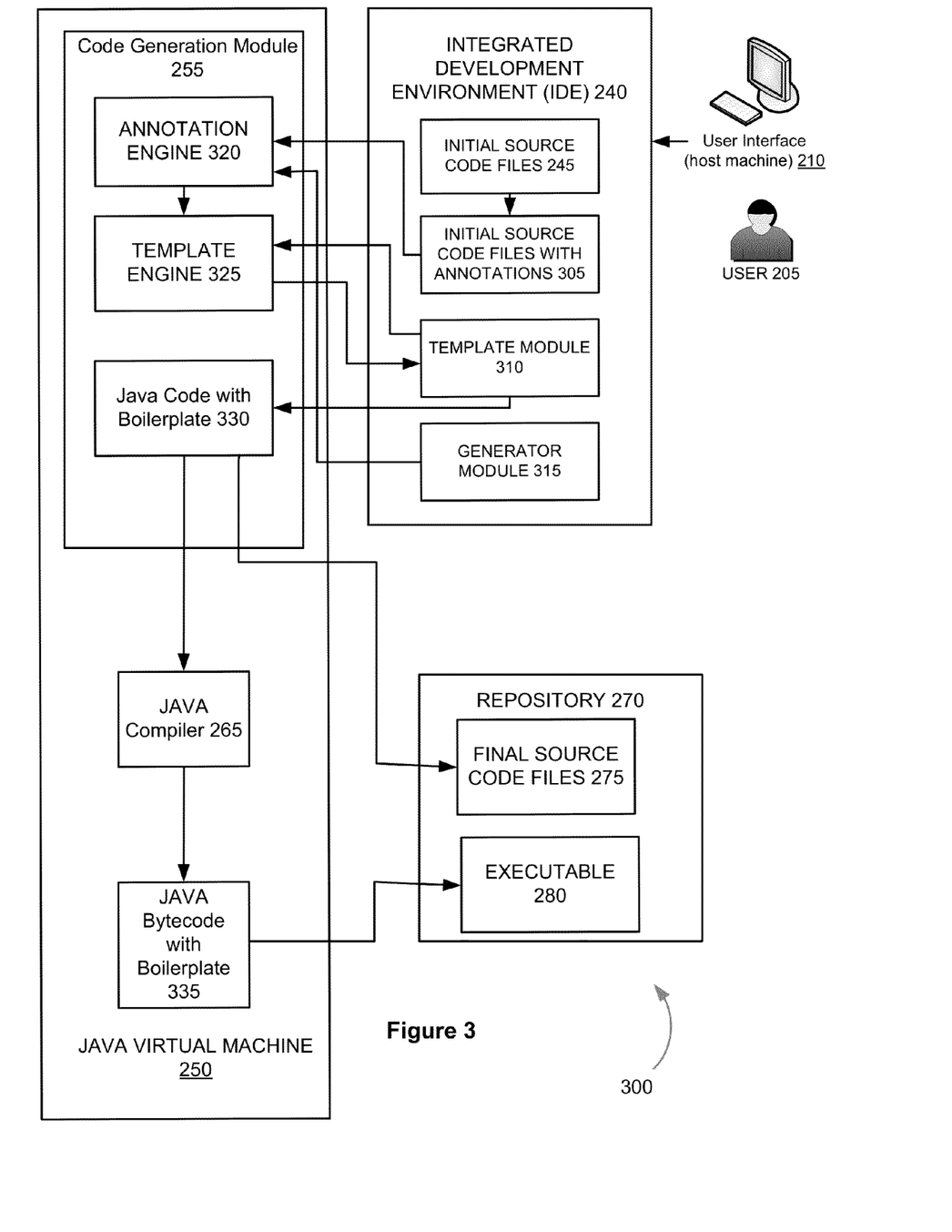
FIG. 3 is a block diagram illustrating one embodiment of generating initial source code files that include annotations for generating boilerplate code.

FIG. 3 is a block diagram illustrating one embodiment of generating initial source code files 245 that include annotations for generating boilerplate code. A user 205 (e.g., a software developer) working with the IDE 240 creates a plurality of initial source code files 245 through an editor (not shown) displayed in the user interface 210. The initial source code files 245 define tasks in the form of logic to be performed and data defining a plurality of identifiers for each task in the form of classes, class methods, interfaces, variables, parameters, and packages. The IDE 240 includes programming tools for programming in Java, C++, Perl, Python, etc. The initial source code files 245 may include one or more annotations (e.g., Java annotations) that indicate that subsequent code is to be automatically generated multiple times as boilerplate code.

In the embodiment shown in FIGS. 2 and 3, the initial source code files with annotations 305 may be programmed, for example, in Java and fed to a Java virtual machine 250. The Java virtual machine 250 may include a code generation module 255 comprising an annotation engine 320, a template engine 325, and a Java compiler 265. Annotation in Java source code is a special form of syntactic metadata that can be added to Java source code. Java classes, methods, variables, parameters and packages may be annotated. When compiled, the Java compiler 265 conditionally stores annotation metadata in class files if the annotation has a retention policy of CLASS or RUNTIME, At runtime, the Java virtual machine (NM) 250 can look for the annotation metadata to determine how to interact with various program elements or to change their behavior.

The annotation engine 320 of the code generation module 255 may be configured to scan the source code files with annotations 305 for an annotation identifying metadata of one or more elements whose source code is to be generated. The annotation engine 320 may be configured to scan a generator module 315 programmed by the user 205 in the IDE 240 for instructions for processing the metadata of the element. The template engine 325 of the code generation module 255 may be configured to scan the generator module 315 for a template module 310 that includes an indication of a location for inserting the processed metadata of the element in an output file. The template engine 325 may be configured to process the metadata of the element of the generator module 315 according to the instructions. The template engine 325 may be configured to insert the processed metadata of the element at the indicated location in the output file to produce code (e.g. Java code) with boilerplate code 330.

The Java compiler 265 converts the Java source code with boilerplate code 330 into operable information in the form of Java bytecode with boilerplate code 335. The operable information may be an executable file 280. The Java virtual machine 250 may be coupled to a repository 270 for storing the logic (e.g., the Java code with boilerplate code 330) and the operable information (e.g., the Java bytecode with boilerplate code 335 stored as an executable file 280). The repository 270 may be implemented in the memory 225 or transmitted to a remote memory (not shown) over a network (not shown) via the hardware device(s) 230 by the one or more CPUs 220.

Figure 4:
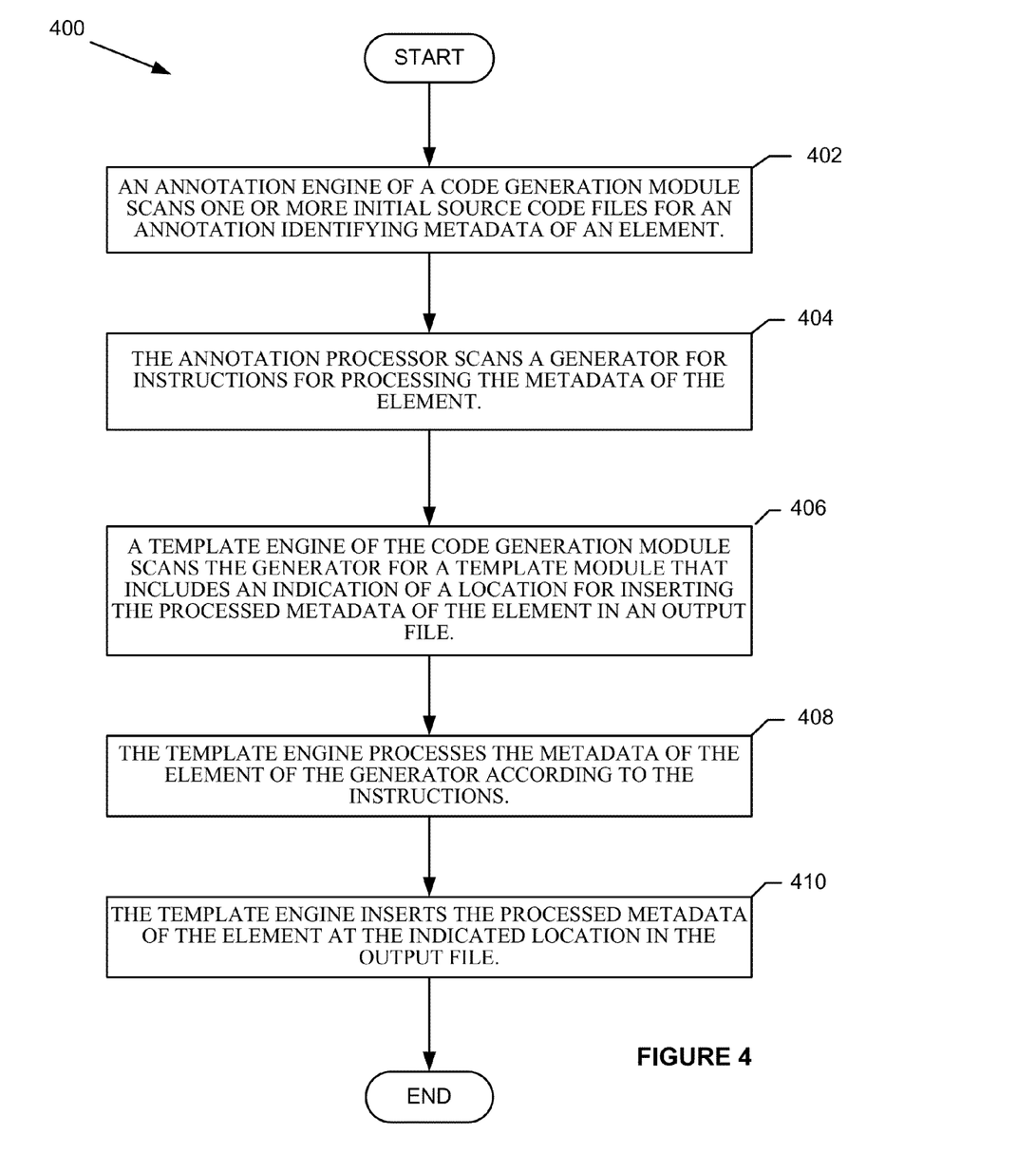
FIG. 4 is a flow diagram illustrating one embodiment of a method for generating boilerplate code.

FIG. 4 is a flow diagram illustrating one embodiment of a method 400 for generating boilerplate code. Method 400 may be performed by processing logic (e.g., in computer system 900 of FIG. 9) that may comprise hardware (e.g., circuitry, dedicated logic, programmable logic, microcode, etc.), software (such as instructions run on a processing device), firmware, or a combination thereof. In one embodiment, method 400 is performed primarily by the code generation module 255 residing within the Java virtual machine 250 and running on the operating system 235 of the computing environment 200 of FIGS. 2 and 3.

Referring to FIG. 4, in one embodiment, method 400 begins when, at block 402, the annotation engine 320 of the code generation module 255 scans one or more initial source code files with annotations 245 for an annotation identifying metadata of an element (e.g., one or more software components or set of components whose code is to be generated as boilerplate code). In one embodiment, the annotation engine 320 is a Java annotation processing tool.

Figure 5:
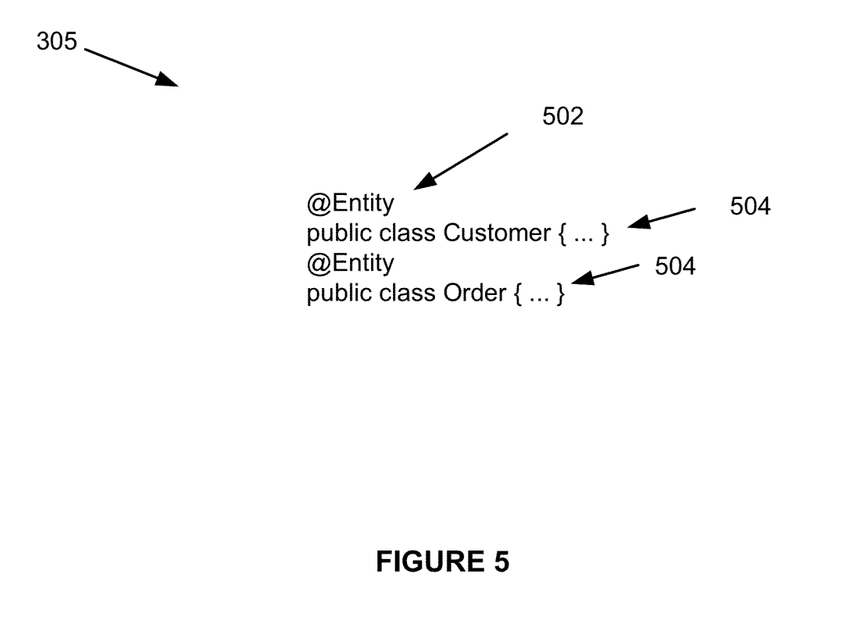
FIG. 5 depicts one embodiment of a Java source code file with annotations that identify metadata of an element.

FIG. 5 depicts one embodiment of a Java source code file with annotations 305 that identifies metadata of an element. Suppose the boilerplate code to be generated is to be included in an XML file that lists all Java "entities". The element(s) 504 may be, for example, class definitions (e.g., "Customer" and "Order"). These element(s) 504 are preceded by a Java annotation 502 (e.g., "@Entity" as indicated with the "@" symbol) that indicates to the generator module 255 discussed below that boilerplate code is to be generated for an object specified by the element(s) 504. The actual classes "Customer" and "Order" are not directly passed to the generator module 255, but the "@Entity" annotation is used to pass metadata information about these classes, such as what fields, methods, types, etc., the aforementioned classes contain. Effectively, a method is invoked on provided class metadata within the template module 310.

At block 404, the annotation engine 320 scans the generator module 255 for instructions for processing the metadata of the element. In one embodiment, the generator module 255 is defined or implemented as a Java interface. The metadata of the element comprises information about the class of the element. In one embodiment, instructions for processing metadata of the element in the generator module 255 may comprise instructions for matching at least one variable corresponding to the element. The at least one variable to match in the generator module 255 may be a Java source code element. The Java source code element may be one of a class, a class method, an interface, a variable, a parameter, or a package. The at least one variable to match in the generator module 255 may be accepted as at least one variable in the template module 310.

The instructions for processing the metadata of the element in the generator module 255 may further comprise instructions for processing the template module 310. In one embodiment, instructions for processing the metadata of the element in the generator module 255 may comprise instructions for matching each of the at least one variable meeting a criterion. In another embodiment, instructions for processing the metadata of the element in the generator module 255 may comprise instructions for a construct for matching all of the at least one variable meeting a criterion.

Figure 6:
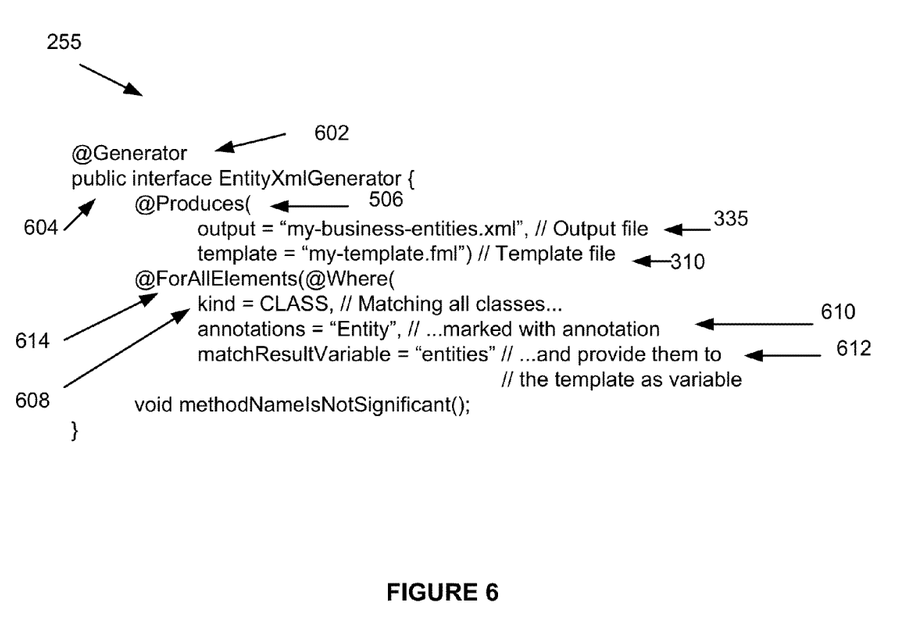
FIG. 6 depicts one embodiment of a generator module that is to be scanned by the annotation engine for instructions for processing the metadata of the element.

FIG. 6 depicts one embodiment of a generator module 255 that is to be scanned by the annotation engine 320 for instructions for processing the metadata of the element(s). The instructions may be encoded, for example, as a Java interface 604 that is indicated as the generator module 255 by a generator annotation 604 (e.g., "@Generator"). The instructions for processing the metadata of the element(s) 504 are encoded in the code following the one or more annotations 614 (e.g., "@ForAllElements (@Where( . . . ))"). In the example, the annotations 614 provide instructions for matching all elements 612 (e.g., in the variable "matchResultVariable") of type 608 (e.g., kind=CLASS (i.e., all classes)) that are marked with the annotation(s) 610 (e.g., "entities" corresponding to "@Entity"). The matched elements 612 are to be provided to the template module 310 as a variable(s) to be processed by the template engine 325.

At block 406, the template engine 325 of the code generation module 255 scans the generator module 255 for the template module 310 that includes an indication of a location for inserting the processed metadata of the element in an output file (e.g., the Java code with boilerplate code 330). The text in the template module 310 (and the output file) may comprise at least one of source code, HTML, XML, or configuration data. The source code may be one of a class, a class method, an interface, a variable, a parameter, or a package. The template engine 325 may access a name of a field or method of the at least one variable in the template module 310. The template engine 325 may then iterate over the name of the at least one variable or the field or method of the at least one variable in the template module 310.

At block 408, the template engine 325 processes the metadata of the element of the generator module 255 according to the instructions. At block 410, the template engine 325 inserts the processed metadata of the element at the indicated location in the template module 310 in the output file (e.g., the Java code with boilerplate code 330).

Figure 7:
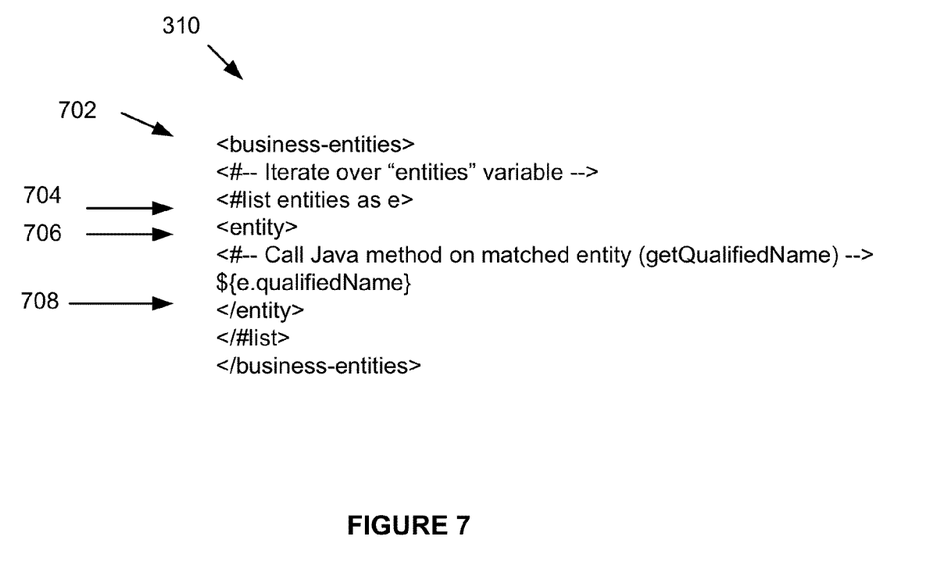
FIG. 7 depicts one embodiment of a template module that includes an indication of a location for inserting the processed metadata of the element in an output file.
Figure 8:
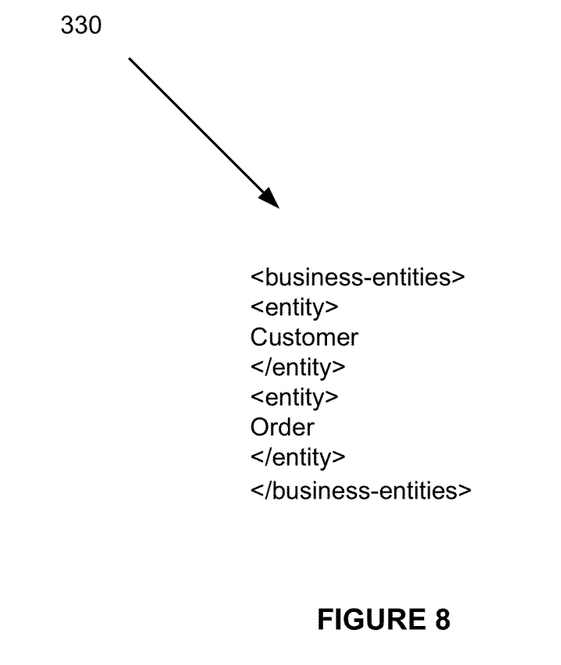
FIG. 8 depicts an exemplary XML output file processed according to instructions of the annotation generator operating on a generator module working in conjunction with the template generator operating on a template file.

FIG. 7 depicts one embodiment of a template module 310 that includes an indication of a location for inserting the processed metadata of the element in the output file 330. The output file 330 (e.g., "my-business-entities.xml") is stored in a variable (e.g., "output"). In the example, the template module comprises fixed data 702 (e.g., "<business-entities>" and "<entity>") followed by non-fixed data as indicated by an iteration 706 over a variable (e.g., "e") which is stored in FIG. 6 as "getQualifiedName". A Java method of "e" is invoked to output the "entities" in the output file (e.g., the Java code with boilerplate code 330 (e.g., "my-business-entities.xml")) shown in FIG. 8.

Figure 9:
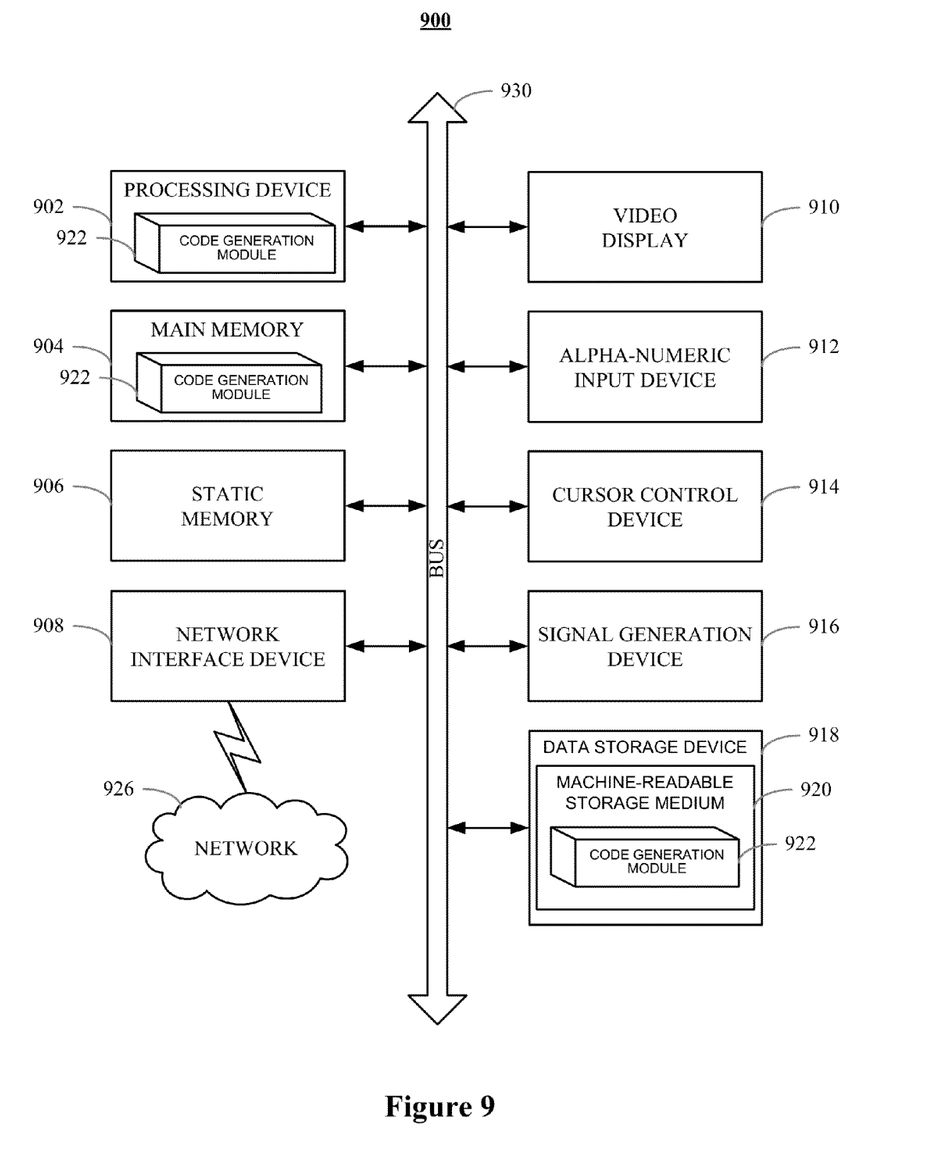
FIG. 9 illustrates a diagrammatic representation of a machine in the exemplary form of a computer system within which a set of instructions, for causing the machine to perform any one or more of the methodologies discussed herein, may be executed.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the code generation module 255 for performing the operations and steps discussed herein.

Computer system 900 may further include a network interface device 908. Computer system 900 also may include a video display unit 910 (e.g., a liquid crystal display (LCD) or a cathode ray tube (CRT)), an alphanumeric input device 912 (e.g., a keyboard), a cursor control device 714 (e.g., a mouse), and a signal generation device 916 (e.g., a speaker).

Data storage device 918 may include a machine-readable storage medium (or more specifically a computer-readable storage medium) 920 having one or more sets of instructions (e.g., the code generation module 255) embodying any one or more of the methodologies of functions described herein. The ID handler module 355 may also reside, completely or at least partially, within main memory 904 and/or within processing device 902 during execution thereof by computer system 900; main memory 904 and processing device 902 also constituting machine-readable storage media. The code generation module 255 may further be transmitted or received over a network 926 via network interface device 708.

Machine-readable storage medium 920 may also be used to store the device queue manager logic persistently. While machine-readable storage medium 920 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    scanning, by a processing device, a source code file to identify a repeating pattern via one or more annotation identifying metadata of an element;
    scanning a generator module for instructions to process the metadata of the element, wherein the instructions are encoded with one or more annotations and comprise a matching criterion and instructions to process a template; wherein the matching criterion comprises instructions to match the element to a source code element associated with a compiler;
    scanning the generator module for the template module that comprises an indication of one or more location to insert the processed metadata of the element in an output file;
    processing the metadata of the element of the generator module according to the instructions;
    storing the metadata in view of a retention policy; and
    inserting the processed metadata of the element at the indicated location in the output file.

2. The method of claim 1, wherein instructions to process metadata of the element in the generator module comprise instructions to match at least one variable corresponding to the element.

3. The method of claim 2, wherein the at least one variable to match in the generator module is a Java™ source code element.

4. The method of claim 3, wherein the Java™ source code element is one of a class, a class method, an interface, a variable, a parameter, or a package.

5. The method of claim 3, wherein the at least one variable to match in the generator module is accepted as at least one variable in the template module.

6. The method of claim 5, further comprising accessing a field or a method of the at least one variable in the template module.

7. The method of claim 6, further comprising, iterating over at least one variable or the field or the method of the at least one variable in the template module.

8. The method of claim 1, wherein the generator module is a Java™ interface.

9. The method of claim 1, wherein instructions to process the metadata of the element in the generator module comprise instructions to process the template module.

10. The method of claim 1, wherein instructions to process the metadata of the element in the generator module comprise instructions to match each of the at least one variable meeting a criterion.

11. The method of claim 1, wherein instructions to process the metadata of the element in the generator module comprise instructions for a construct to match all of the at least one variable meeting a criterion.

12. The method of claim 1, wherein the text in the output file comprises at least one of source code, HTML, XML, or configuration data.

13. The method of claim 12, wherein the source code is one of a class, a class method, an interface, a variable, a parameter, or a package.

14. The method of claim 1, wherein the metadata of the element comprises information about a class of the element.

15. A computer system, comprising:
    a memory; and
    a processing device, operatively coupled to the memory, the processing device to:
        scan a source code file to identify a repeating pattern via one or more annotation identifying metadata of an element;
        scan to identify instructions to process the metadata of the element, wherein the instructions are encoded with one or more annotations and comprise a matching instructions to match the element to a source code element associated with a compiler;
        scan to identify the template module that comprises an indication of one or more locations to insert the processed metadata of the element in an output file;
        process the metadata of the element according to the instructions;
        store the metadata in view of a retention policy; and
        insert, by the template engine, the processed metadata of the element at the indicated location in the output file.

16. The system of claim 15, wherein the instructions to process metadata of the element comprise instructions to match at least one variable corresponding to the element.

17. The system of claim 15, further comprising a Java™ interface.

18. A non-transitory computer-readable storage medium comprising instructions that cause a processing device to:
    scan a source code file to identify a repeating pattern via one or more annotation identifying metadata of an element;
    scan a generator module for instructions to process the metadata of the element, wherein the instructions are encoded with one or more annotations and comprise a matching criterion and instructions to process a template; wherein the matching criterion comprises instructions to match the element to a source code element associated with a compiler;

scan the generator module for the template module that comprises an indication of one or more locations to insert the processed metadata of the element in an output file;
process, by the processing device, the metadata of the element of the generator module according to the instructions;
store the metadata in view of a retention policy; and
insert the processed metadata of the element at the indicated location in the output file.

19. The non-transitory computer-readable storage medium of claim 18, wherein the instructions for processed metadata of the element in the generator module comprise instructions to match at least one variable corresponding to the element.

20. The non-transitory computer-readable storage medium of claim 18, wherein the generator module is a Java™ interface.

* * * * *